(12) United States Patent
Mitchell

(10) Patent No.: US 11,473,606 B2
(45) Date of Patent: Oct. 18, 2022

(54) INSTALLING TOOL

(71) Applicant: MONOGRAM AEROSPACE FASTENERS, INC., Los Angeles, CA (US)

(72) Inventor: James Mitchell, Downey, CA (US)

(73) Assignee: MONOGRAM AEROSPACE FASTENERS, INC., Los Angeles, CA (US)

( * ) Notice: Subject to any disclaimer, the term of this patent is extended or adjusted under 35 U.S.C. 154(b) by 424 days.

(21) Appl. No.: 16/449,607

(22) Filed: Jun. 24, 2019

(65) Prior Publication Data

US 2019/0390697 A1    Dec. 26, 2019

Related U.S. Application Data

(60) Provisional application No. 62/688,458, filed on Jun. 22, 2018.

(51) Int. Cl.
| | | |
|---|---|---|
| *B21J 15/26* | (2006.01) | |
| *B21J 15/12* | (2006.01) | |
| *B21J 15/10* | (2006.01) | |
| *B21J 15/04* | (2006.01) | |
| *F16B 19/10* | (2006.01) | |

(52) U.S. Cl.
CPC .......... *F16B 19/1072* (2013.01); *B21J 15/04* (2013.01); *F16B 19/1054* (2013.01); *B21J 15/10* (2013.01); *B21J 15/12* (2013.01); *B21J 15/26* (2013.01)

(58) Field of Classification Search
CPC ... B21J 15/10; B21J 15/04; B21J 15/12; B21J 15/26; F16B 19/1072; F16B 19/1054; B25B 21/002

USPC ........................................................ 29/243.53
See application file for complete search history.

(56) References Cited

U.S. PATENT DOCUMENTS

| | | | | |
|---|---|---|---|---|
| 2,819,635 | A * | 1/1958 | Better | B25B 23/141 |
| | | | | 464/37 |
| 3,620,105 | A * | 11/1971 | Batten | B25B 21/002 |
| | | | | 81/57.14 |
| 3,908,487 | A * | 9/1975 | Plaw | B25B 15/04 |
| | | | | 81/59.1 |
| 4,787,274 | A | 11/1988 | Belanger | |
| 9,782,821 | B1 * | 10/2017 | Gregory | B21J 15/105 |
| 10,118,280 | B2 * | 11/2018 | Bigot | B25B 21/002 |
| 2015/0143686 | A1 * | 5/2015 | Blacket | B21J 15/26 |
| | | | | 29/525.06 |

(Continued)

FOREIGN PATENT DOCUMENTS

| | | |
|---|---|---|
| EP | 0195851 | 10/1986 |
| EP | 0466609 | 1/1992 |

OTHER PUBLICATIONS

European Patent Office, International Search Report and Written Opinion of PCT/US2019/038641, dated Nov. 11, 2019.

*Primary Examiner* — Sarang Afzali
*Assistant Examiner* — Darrell C Ford
(74) *Attorney, Agent, or Firm* — McDonald Hopkins LLC

(57) ABSTRACT

An installation tool includes a motor portion and a nose portion. The nose portion includes an opening for receiving a fastener. The nose portion includes a roller cages. The roller cages include a plurality of rollers. The plurality of rollers includes at least two rollers that are offset from other rollers of the plurality of rollers. The nose portion may include a first portion that is selectively attachable to a second portion.

18 Claims, 5 Drawing Sheets

(56) References Cited

U.S. PATENT DOCUMENTS

2016/0129567 A1    5/2016  Bigot
2019/0015962 A1    1/2019  Wang
2019/0390697 A1*  12/2019  Littlejohn ........... F16B 19/1054
2021/0372460 A9*  12/2021  Davis ...................... F16B 39/24

* cited by examiner

INSTALLING TOOL

CROSS-REFERENCE TO RELATED APPLICATION

This application claims priority to U.S. Provisional Patent Application No. 62/688,458 entitled "Installing Tool," filed on Jun. 22, 2018, which is incorporated herein by reference in its entirety.

TECHNICAL FIELD

This disclosure relates to an installing tool, and, more specifically, to an installing tool for a fastener having one or more roller cages.

BACKGROUND

Rivets and other types of fasteners are used in manufacturing to hold workpieces together. Such rivets may hold together metal or other materials and may be high-strength fasteners. In some manufacturing operations, apertures are drilled through workpieces and then rivets are installed in the apertures.

Installation tools, such as wrenches are used to install rivets. The installation tools can be adjustable to grip the rivets being installed or are of a fixed irregular inner configuration of the device which it is desired to grip. As an example, when two panels are affixed together, a wedging-type fastener may be inserted into corresponding apertures. Such installation is usually carried out quickly. These wedging-type fasteners temporarily align the panels and may be replaced with more permanent fasteners.

Installers must carefully align a nose portion of an installation tool with a fastener for installation of the fastener. Fasteners may come in different shapes, such as cylindrical and polygonal. As such, some wrenching tools may accommodate only a single shape. Further, such tools are prone to improper engagement or misalignment of fasteners within a nose portion.

Therefore, there is a need in the art for a more efficient installation tool and improved fastener alignment.

SUMMARY

The present disclosure includes a system, method, and devices related to data collection and communication of the performance of various vehicle accessories and systems. These accessories and systems are described in detail below, and any combination of elements and/or methods are contemplated as aspects and embodiments of the overall invention.

An installation tool for installing a fastener in a workpiece, the installation tool comprising a motor portion, and a nose portion operatively attached to the motor portion. The nose portion may comprise one or more roller cages. Each roller cage may comprise a plurality of rollers disposed about an annular inner surface of the roller cage, wherein at least two rollers of the plurality of rollers are offset. The at least two rollers are generally opposite each other. The non-offset rollers of the plurality of rollers are disposed between the at least two rollers that are offset. The at least two rollers are generally closer to a polar axis of the roller cage than non-offset rollers of the plurality of rollers. The at least two rollers comprise a greater diameter than non-offset rollers of the plurality of rollers. The nose portion comprises a first portion and a second portion. The first portion and the second portion are selectively attachable to each other. The first portion comprises at least two flattened surfaces or wrench flats for receiving tool. The second portion comprises at least two flattened surfaces for receiving tool. The second portion comprises the roller cage.

In an example, the nose portion may include a first cage and a second cage. The first cage may receive a fastener and may prevent a body of the fastener from rotating within the first cage. The second cage may apply torque to initiate installation and provide a driving force.

Also described is an installation tool for installing a fastener in a workpiece, the installation tool comprising a motor portion; and a nose portion operatively attached to the motor portion, the nose portion comprising a first roller cage and a plurality of rollers disposed about an annular inner surface of the first roller cage, wherein at least two rollers of the plurality of rollers are offset; and a second roller cage, wherein the first roller cage operatively prevents rotation of the body and the second roller cage may provide force to install and un-install the fastener. The plurality of rollers may further comprise at least two rollers that are not offset. The at least two rollers that are offset may extend towards a central axis of the first roller cage a greater distance from the annular inner surface than the at least two rollers that are not offset.

Described herein is a method of installing or uninstalling a fastener comprising providing an installation tool for installing a fastener in a workpiece, the installation tool comprising a motor portion; and a nose portion operatively attached to the motor portion, the nose portion comprising a roller cage and a plurality of rollers disposed about an annular inner surface of the roller cage, wherein at least two rollers of the plurality of rollers are offset and at least two rollers are not offset; and receiving a fastener within the roller cage such that the at least two rollers that are offset contact the fastener prior to the at least two rollers that are non-offset contacting the fastener. The method may further comprise inserting the fastener in the roller cage until the at least two rollers that are offset are depressed until the fastener contacts and depresses the at least two rollers that are not offset. The method may further comprise uninstalling the fastener with the installation tool. The method may further comprise uninstalling the fastener with the uninstallation tool.

The foregoing embodiments are merely exemplary of some of the aspects of the system. Additional features and elements may be contemplated and described herein. Also, features from one of the foregoing embodiments may be combined with features from any of the other foregoing embodiments.

DETAILED DESCRIPTION

Figure 1:
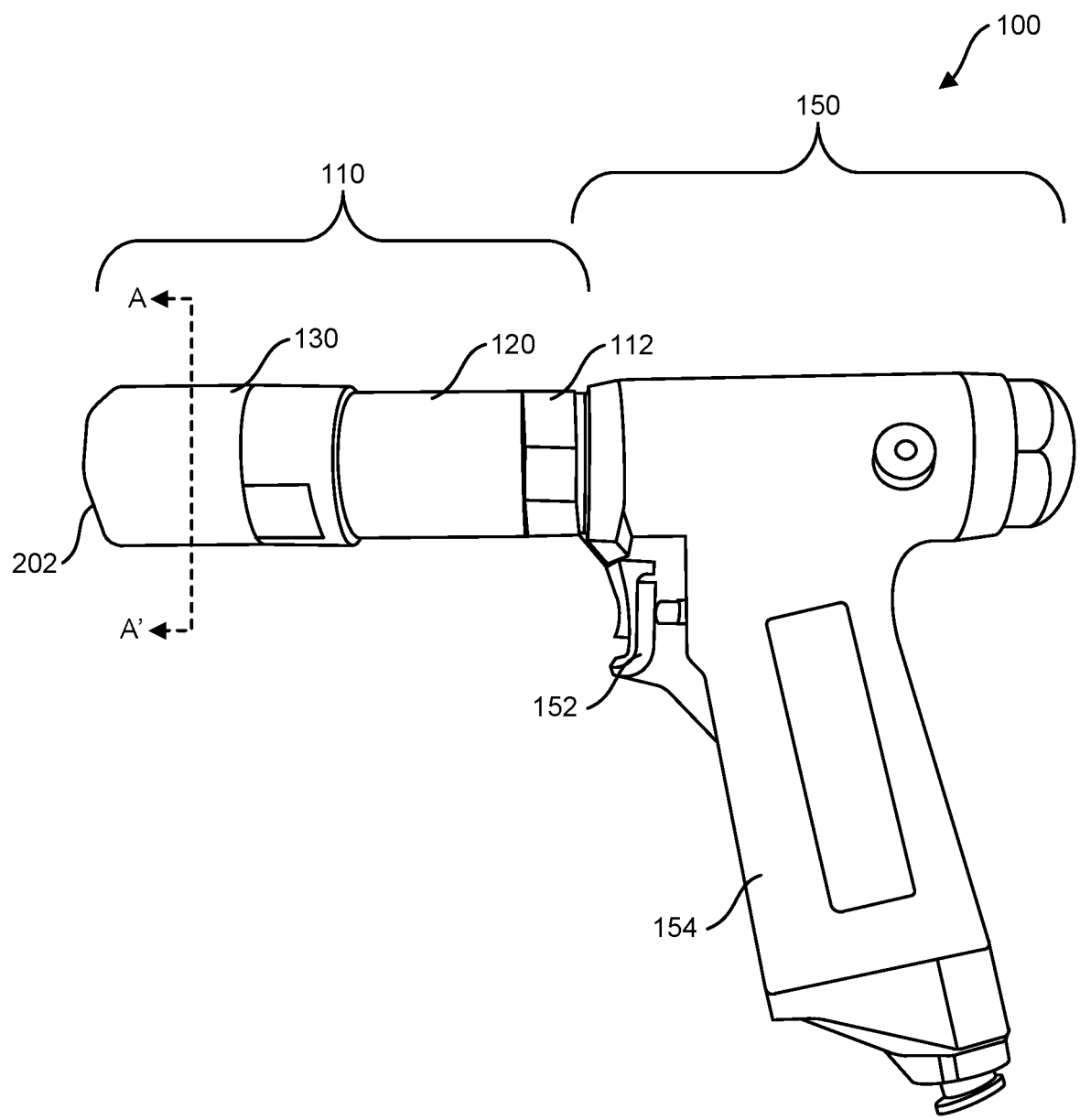
FIG. 1 is a side view of an installation tool of the present disclosure.

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

As used herein, the words "example" and "exemplary" mean an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

Furthermore, the terms "user," "installer," "technician," and the like are employed interchangeably throughout the subject specification, unless context suggests otherwise or warrants a particular distinction among the terms. It is noted that such terms may refer to human entities or automated components. As such, embodiments may describe a user action that may not require human action.

As used herein, a fastener may refer to various types of rivets, screws, bolts, or the like. Such fasteners may comprise metals, plastics, or other materials. For example, fastener may refer to a cylindrical rivet comprising a metal body (e.g., mild steel, steel, etc.). Moreover, embodiments may refer to a specific type of fastener for simplicity of explanation. As such, disclosed aspects may be applicable to various other types of fasteners.

Described embodiments include an installing tools for installing fasteners. The installing tools may be lightweight with respect to other installing tools. For instance, the installing tools may comprise a nose portion operatively attached to a power source or motor. The nose portion may comprise lightweight materials, such as aluminum. In another aspect, the nose portion may comprise a plurality of separable sections. For example, the nose portion may comprise a first portion and a second portion. The first portion may house a first roller bearing and the second portion may comprise a second roller bearing. This may allow a user to repair or replace one of the first or second portions. The first portion may provide an inner surface that may be integral formed with the first portion. The inner surface may be generally funnel shaped to provide a compliance feature for aligning a fastener. This integral formation may reduce or prevent improper connections, breaks or seams in the first portion, or the like. It is noted that some embodiments may include cages that may include two differently oriented one-way roller bearing clutches. One cage may prevent rotation of the body and the other may provide force. that may allow the bearings to both install and un-install a fastener. The orientation of the clutches would become longer due to the one-way roller bearing clutches.

In another aspect, the nose portion may include one or more cages (e.g., two cages, etc.). Each cage may comprise a roller bearing assembly comprising a number of roller bearings disposed about an internal periphery of the cage. As described herein, the roller bearings may include at least one bearing that is offset with respect to a circumference of the other bearings. The at least one offset bearing may allow for compliance in the alignment and positioning of the rollers within the cage assembly to accommodate fastener insertion. In some systems without an offset roller, the fastener approach to the cage would meet the rollers head-on and force the cage back in the tool precluding proper engagement.

Turning now to FIG. 1, there is an installation tool 100 that may be utilized to operatively manipulate (e.g., install or un-install) a fastener. The installation tool 100 may comprise a wrench or nose portion 110 and a motor portion 150. The motor portion 150 may comprise or be coupled to a power source. It is noted that the power source may comprise electric, pneumatic, or other power sources. In another aspect, the motor portion 150 may include an actuator 152 and a handle 154. The actuator 152 may actuate the power source. The handle 154 may comprise an ergonomic shape to facilitate easy of operation.

The nose portion 110 may be operatively attachable to the motor portion 150 via threads, set screws, bayonet attachment, or the like. In an example, the nose portion 110 may include a collar 112 that may threadingly engage with the motor portion 150. In an example shown in FIG. 5, the motor portion 150 may include an externally threaded wall 156 that operatively receives an internally threaded wall of the nose portion 110. As such, the nose portion 110 may be removed from motor portion 150. In some embodiments, however, the nose portion 110 may be permanently affixed with the motor portion 150.

Figure 4:
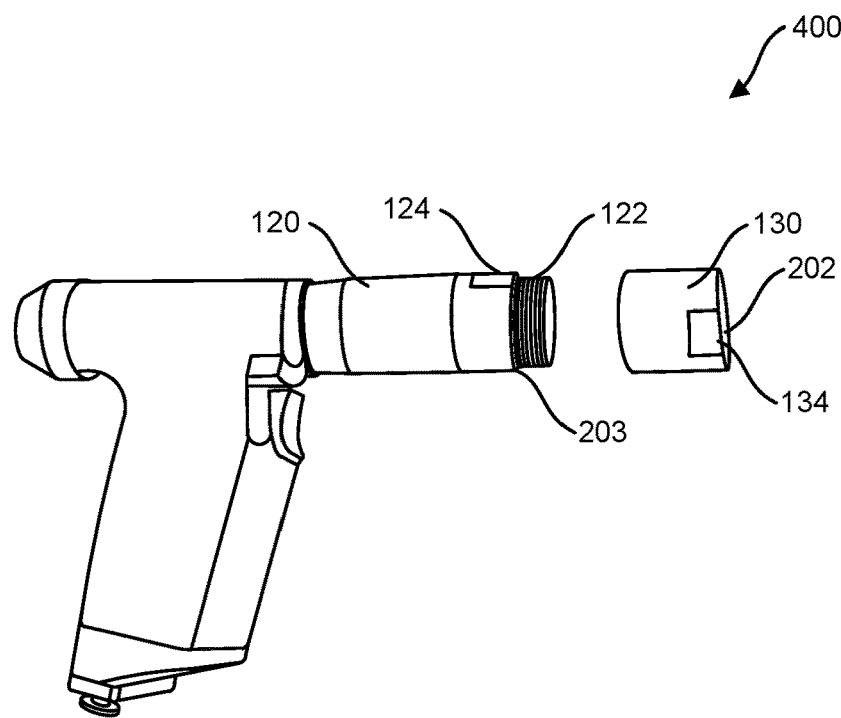
FIG. 4 is a side view of the installation tool of FIG. 1 in a first selectively disconnected state in accordance with the present disclosure.

In embodiments, the nose portion 110 may comprise a rear or first portion 120 and a nose or second portion 130. The first portion 120 and the second portion 130 may be operatively attachable with each other. For instance, FIG. 4 illustrates the first portion 120 detached from the second portion 130. It is noted that the first portion 120 and the second portion 130 may be attached via a threaded connection, a set screw, bayonet attachment, or the like. In at least one embodiment, the second portion 130 may comprise an internally threaded wall and the first portion 120 may comprise an externally threaded wall 122 that may attach together. The second portion 130 may comprise one or more flattened surfaces 134 that may allow a user to grip the second portion 130, such as with a wrench. It is noted that the flattened surfaces 134 may be knurled. In at least one embodiment, the second portion 130 comprises two flat surfaces 134 that are opposite each other about the periphery of the second portion 130. The first portion 120 may additionally or alternatively comprise at least one flat surface 124 that may allow a user to grip the first portion 120. In at least one embodiment, the first portion 120 comprises two flat surfaces 124 that are opposite each other about the periphery of the first portion 120.

In an example, a user may grip the first portion 120 and the second portion 130 with wrenches at the flat portions 124, 134. This may allow the user to easily separate or tighten the first portion 120 and the second portion 130 to each other. In another aspect, the flat portions 124, 134 may prevent or reduce damage to the nose portion 110 during attachment or removal. It is noted that the user may grasp other portions of the installation tool 100, such as collar 112 or the like.

In at least one aspect, the flat portion 134 may be disposed at a distal end 202 of the second portion 130 and the flat portion 124 may be disposed at a distal end 203 of the first portion 120. As such, the installation tool 100 may provide space of a user to grasp the flat portions 124, 134 at the same time.

Figure 2:
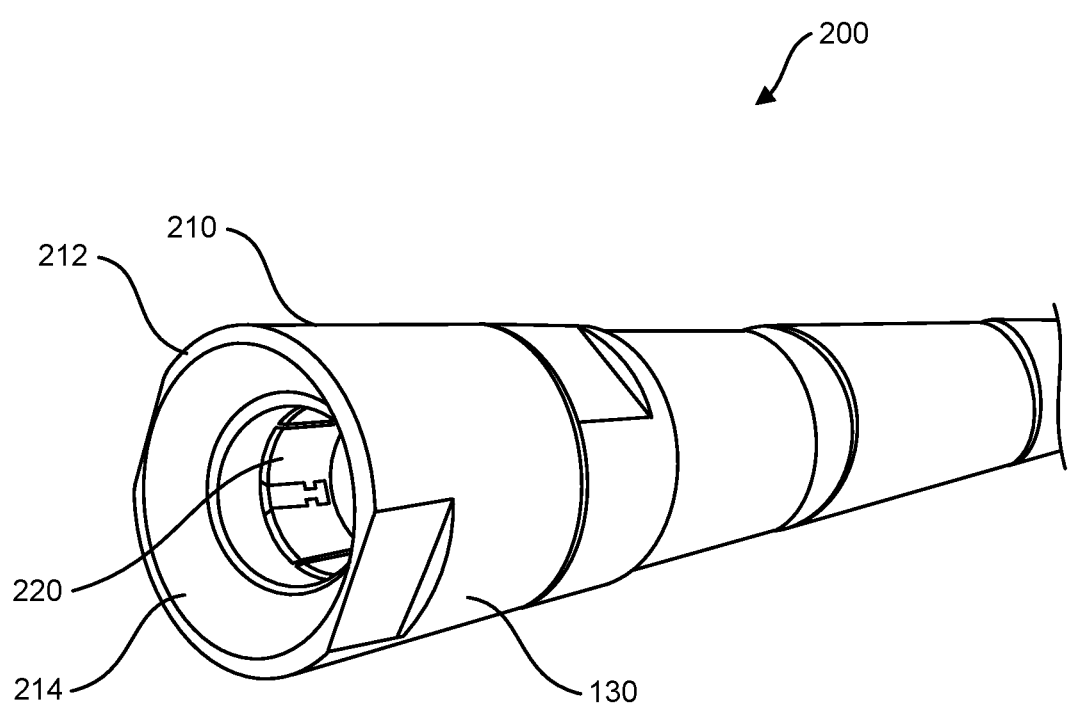
FIG. 2 is a front perspective view of the installation tool of FIG. 1 in accordance with the present disclosure.

Turning to FIG. 2, with reference to the other figures, the tool 100 is illustrated from a front prospective view. The second portion 130 may comprise a housing 210 that operatively houses a cage 220. The housing 210 comprises an opening 212 that may allow for insertion of a fastener to be installed or removed. In another aspect, the opening 212 may provide access to an inner surface 214. The inner surface 214 may be tapered, concave, funnel-shaped, generally frustoconical, or otherwise shaped to allow a fastener to be direct towards the cage 220. Cage 220 may be retained in the housing 210.

Figure 3:
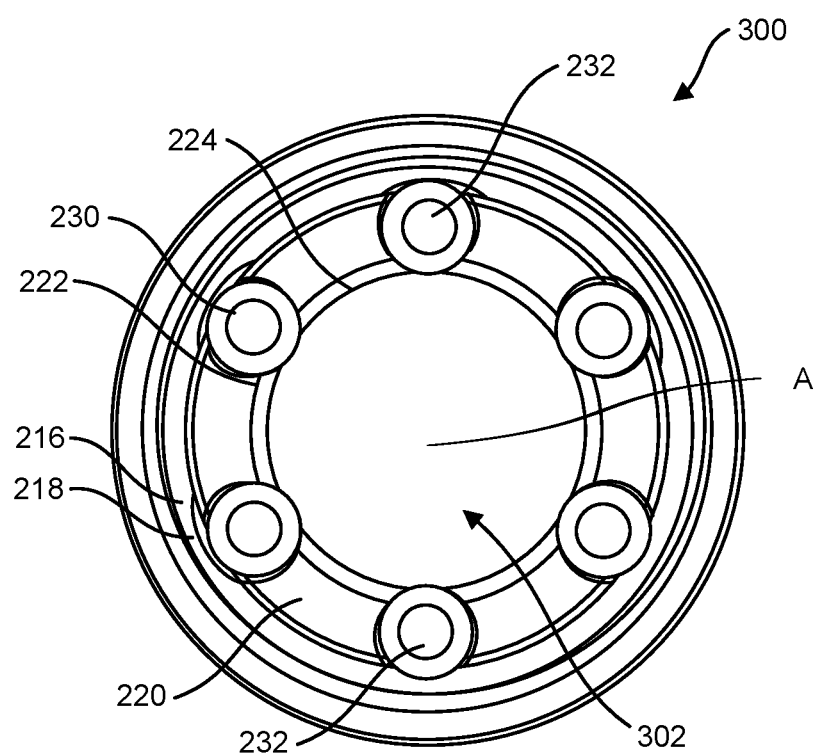
FIG. 3 is a cross-sectional view of the installation tool of FIG. 1 taken along line A-A' in accordance with the present disclosure.

Turning to FIG. 3, there is a cross-sectional view of the first portion 120 or second portion 130 including the cage 220. It is noted that first portion 120 and the second portion 130 may comprise similar cages that provide offset roller bearings. Housing 210 may be oriented about a central axis A and comprise an inner wall 216 (as shown in FIG. 3) that may circumscribe the cage 220. In an aspect, the inner wall 216 may comprise an n-sided polygon, where n is a number. For example, the inner wall 216 may comprise a 6, 8, 12 or other sided polygon. It is noted, however, that the inner wall 216 may comprise other shapes. In another aspect, corners 218 may be disposed between sides of the inner wall 215. The corners 216 may be curved, angled, concave, or the like.

Cage 220 may comprise a cylindrical body having one or more openings 222 formed therein. The openings 222 may be generally equally spaced about an inner periphery 224 of the cage 220. It is noted that the cage 220 may comprise k openings 222, where k is a number. The openings 222 may receive bearings or rollers 230. The rollers 230 may be disposed between the inner wall 216 and the cage 220. In an aspect, a spring or other biasing device (not shown) may be disposed between the rollers 230 and the inner wall 216. For example, the spring may comprise a garter spring disposed in a channel of the rollers 230. The garter spring may force or bias the rollers 230 away from the inner wall 216.

In embodiments, one or more offset rollers 232 may be generally offset with respect to the other rollers 230. For instance, the rollers 230 may be disposed about a circumference defined by the inner most surface of each roller 230 that is closest to the polar axis of the cage 220. The offset rollers 232 comprise are generally not aligned with the circumference. In an example, at least two rollers 232 may be generally offset with respect to the other rollers. The offset rollers 232 are non-consecutive rollers about a circumference formed by the rollers 230 that are not offset. As such, one or more rollers of rollers 230 may be disposed between the offset rollers 232. According to at least one embodiment, the offset rollers 232 may be disposed generally opposite each other.

The offset rollers 232 may be offset from the other rollers via offset rollers 232 due to offset rollers extending closer to a center of the cage 220. This may be accomplished by providing a biasing member, adjusting openings 222 sizes, or adjusting the size of rollers. For instance, the offset roller 232 may be larger than the other rollers. In another aspect, the cage 220 may allow for offset as corresponding openings 222 may be of different sizes, or the like. Moreover, offset rollers 232 may be associated with springs having a different strength than the springs of the non-offset rollers.

An opening 302 of the cage 220 may receive a fastener to be installed into a workpiece. The fastener may comprise a generally cylindrical head. The diameter of the fastener head may be generally lesser than the diameter of the opening 302. When the fastener is inserted into the opening 302, the rollers 230 may retract against the bias of corresponding springs. This may retain the fastener as a user positions the tool and fastener for installation.

The offset of the offset rollers 232 may generally prevent or reduce cam over when a fastener is received via opening 302. The offset may provide compliance in the alignment and positioning of the rollers 232 within the cage 220 to better accommodate fastener insertion. In tools without the offset of rollers 230, the fastener approach to the tool can meet the rollers head on and force the cage assembly back in the tool precluding proper engagement.

In another aspect, a motor, which may be disposed in the motor portion 150, actuates a rotational shaft to rotate the nose portion 110. Generally, a fastener disposed within the cage 220 is forced into an aperture of a work piece and may be locked into place via the rotation of the nose portion 110.

Figure 5:
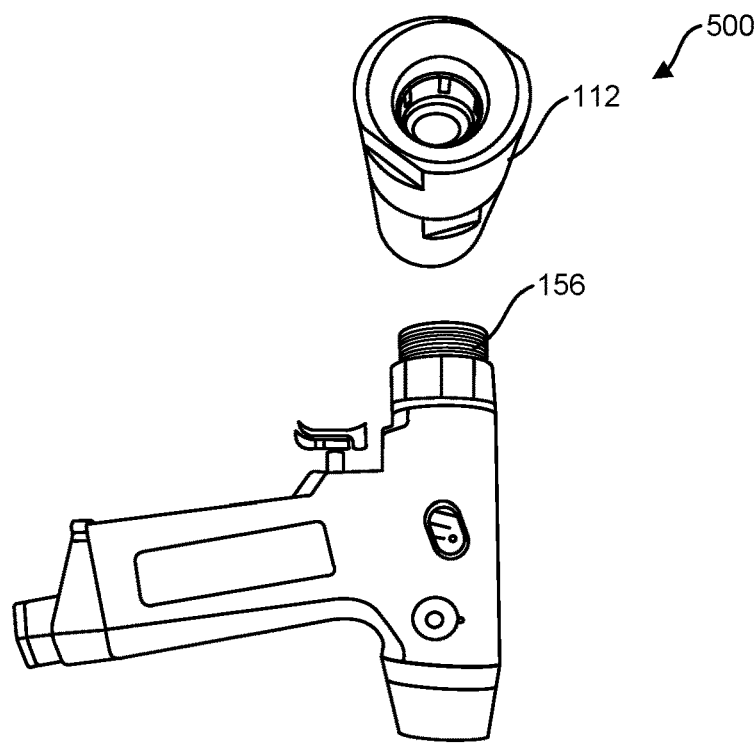
FIG. 5 is a side view of the installation tool of FIG. 1 in a second selectively disconnected state in accordance with the present disclosure.

FIGS. 4-5 illustrate the tool 100 in partially disassembled states 400 and 500. In FIG. 4, the first portion 120 and the second portion 130 are detached from each other. This may allow for servicing or replacing of the first portion 120 or the second portion 130 or components thereof. In FIG. 5, the nose portion 110 is completely detached from the tool 100.

Figure 6:
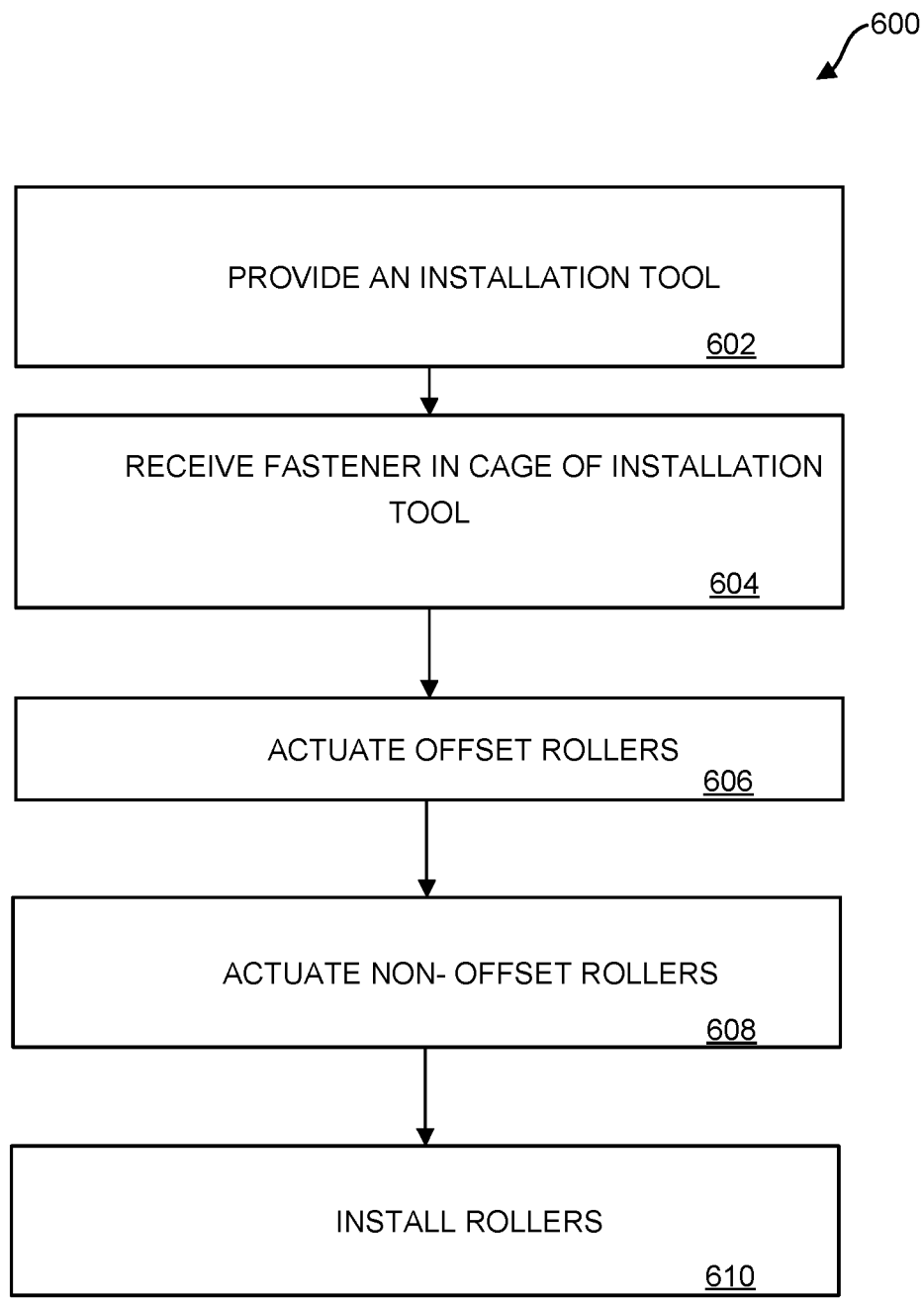
FIG. 6 is a method of installing a tool in accordance with the present disclosure.

In view of the subject matter described herein, methods that may be related to various embodiments may be better appreciated with reference to the flowchart of FIG. 6. While the method(s) are shown and described as a series of blocks, it is noted that associated methods or processes are not limited by the order of the blocks unless context suggests otherwise or warrants a particular order. It is further noted that some blocks and corresponding actions may occur in different orders or concurrently with other blocks. Moreover, different blocks or actions may be utilized to implement the methods described hereinafter. Various actions may be completed by one or more of users, mechanical machines, automated assembly machines (e.g., including one or more processors or computing devices), or the like.

Turning now to FIG. 6, there is a method 600 that may provide for installation of a fastener via an installation tool as described herein. It is noted that the installation tool may comprise various aspects as described with reference to the other figures.

At 602, the method provides an installation tool. The installation tool may comprise a roller cage with one or more offset rollers (e.g., two or more offset rollers, three or more offset rollers, etc.). It is noted that the offset rollers may be generally opposite each other or non-consecutive about the roller cage.

At 604, the method may allow for reception of a fastener within the cage of the installation tool. For instance, a user may insert a fasteners into a nose portion. The fastener may comprise a cylindrical fastener or the like.

At 606, the method may include providing the offset rollers.

At 608, the method may include providing non-offset rollers. The offset rollers may be disposed to generally contact the fastener prior to non-offset rollers contacting the fastener. As the fastener continues to be inserted in the cage, the offset rollers may be depressed until the fastener contacts and depresses the non-offset rollers.

At 610, the method may allow for installation of the rollers. The fastener may be wrenched into a workpiece or the like via a motor as described herein.

While methods may be shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by one or more users, mechanical machines, automated assembly machines (e.g., including one or more processors or computing devices), or the like.

What is claimed is:

1. An installation tool for installing a fastener in a workpiece, the installation tool comprising:
    a motor; and
    a nose portion operatively attached to the motor, the nose portion having:
        a collar engaging the motor,
        a roller cage coupled to the collar, the roller cage having: i) a hollow, cylindrical shaped defining a central axis and an opening configured to receive a fastener for installation or removal, and ii) a plurality of bearing openings formed along an inner surface of the shape, and
        a plurality of rollers, each roller disposed within one of the bearing openings in the roller cage, wherein each roller defines a non-offset circumference that is positioned around a central axis, except for at least two rollers that are offset so as to be positioned at a different circumference with a different diameter in comparison to the non-offset circumference.

2. The installation tool of claim 1, wherein the at least two rollers are generally opposite each other.

3. The installation tool of claim 1, wherein one or more rollers are positioned on the non-offset circumference so as to be disposed between every roller that is offset.

4. The installation tool of claim 1, wherein the different diameter is smaller that of the non-offset circumference.

5. The installation tool of claim 1, wherein the different diameter is greater than the non-offset circumference.

6. The installation tool of claim 1, wherein the nose portion comprises a first portion and a second portion.

7. The installation tool of claim 6, wherein the first portion and the second portion are selectively attachable to each other.

8. The installation tool of claim 6, wherein the first portion comprises at least two flattened surfaces for receiving a tool.

9. The installation tool of claim 6, wherein the second portion comprises at least two flattened surfaces for receiving a tool.

10. The installation tool of claim 6, wherein the second portion comprises the roller cage.

11. The installation tool of claim 6, wherein the first portion comprises a frustoconical inner surface integrally formed with the first portion.

12. The installation tool of claim 6, wherein the second portion comprises a second roller cage configured to provide rotary force.

13. The installation tool of claim 1, wherein the nose portion comprises a knurled portion disposed about an exterior of the nose portion.

14. The installation tool of claim 1 wherein the bearing openings for the offset rollers have a different size in comparison to the bearing openings around the non-offset diameter.

15. The installation tool of claim 1 wherein the offset rollers have a different size in comparison to the rollers around the non-offset diameter.

16. The installation tool of claim 1 wherein one or more biasing members are configured with selected rollers to create the different diameter and/or the non-offset diameter.

17. An installation tool for installing a fastener in a workpiece, the installation tool comprising:
    a motor configured to rotate a nose portion; and
    a nose portion,
    wherein the nose portion includes:
        a first roller cage and a plurality of rollers disposed about an annular inner surface of the first roller cage so as to define a non-offset circumference, wherein at least two rollers of the plurality of rollers are offset along a different circumference from the non-offset circumference; and
        a second roller cage, wherein the first roller cage operatively prevents rotation of a fastener body received within the nose portion and the second roller cage provides rotary force to install and un-install the fastener.

18. The installation tool of claim 17, wherein a diameter of the different circumference is greater than a diameter of the non-offset circumference.

* * * * *